(12) United States Patent
Zhao et al.

(10) Patent No.: US 9,544,982 B2
(45) Date of Patent: Jan. 10, 2017

(54) NOZZLE (71) Applicant: ASML NETHERLANDS B.V., Veldhoven (NL)

(72) Inventors: Jian Zhao, San Diego, CA (US); Tetsuya Ishikawa, San Diego, CA (US)

(73) Assignee: ASML NETHERLANDS B.V., Veldhoven (NL)

( * ) Notice: Subject to any disclaimer, the term of this patent is extended or adjusted under 35 U.S.C. 154(b) by 0 days.

(21) Appl. No.: 14/169,929

(22) Filed: Jan. 31, 2014

(65) Prior Publication Data

US 2015/0223313 A1    Aug. 6, 2015

(51) Int. Cl.
| | |
|---|---|
| *B05B 1/00* | (2006.01) |
| *H05G 2/00* | (2006.01) |
| *B05B 1/02* | (2006.01) |
| *F02M 61/18* | (2006.01) |
| *H01J 49/16* | (2006.01) |
| *B01D 15/08* | (2006.01) |
| *B41J 2/16* | (2006.01) |
| *B05B 15/02* | (2006.01) |

(52) U.S. Cl.
CPC ............. *H05G 2/006* (2013.01); *B01D 15/08* (2013.01); *B05B 1/00* (2013.01); *B05B 1/02* (2013.01); *B05B 15/02* (2013.01); *B05B 15/0208* (2013.01); *B41J 2/162* (2013.01); *F02M 61/1853* (2013.01); *H01J 49/165* (2013.01); *H05G 2/008* (2013.01); *Y10S 239/19* (2013.01)

(58) Field of Classification Search
CPC .............. B05B 1/00; B05B 1/02; B05B 15/02; B05B 15/0208; F02M 61/1853; Y10S 239/19; H01J 49/165; B01D 15/08; B41J 2/162
USPC ........ 239/589, 596, 601, 602, DIG. 19, 104, 239/106; 250/288; 201/198.2; 216/56
See application file for complete search history.

(56) References Cited

U.S. PATENT DOCUMENTS

| | | | | |
|---|---|---|---|---|
| 4,007,464 A | * | 2/1977 | Bassous | B41J 2/025 239/601 |
| 4,733,823 A | * | 3/1988 | Waggener | B41J 2/162 239/601 |
| 6,596,988 B2 | * | 7/2003 | Corso | B01J 20/261 250/288 |
| 7,828,232 B2 | * | 11/2010 | Oomori | F02M 51/061 239/104 |
| 2002/0139751 A1 | * | 10/2002 | Zhang | H01J 49/167 210/198.2 |

* cited by examiner

*Primary Examiner* — Steven J Ganey
(74) *Attorney, Agent, or Firm* — Arent Fox LLP (57) ABSTRACT

An EUV light source target material handling system is disclosed which includes a target material dispenser and a target material repository including a nozzle with a radial trench design. The nozzle may be formed from a silicon-on-insulator wafer.

19 Claims, 5 Drawing Sheets

NOZZLE

FIELD

The present disclosure relates to a nozzle structure useful for supply of liquid target material in a system that vaporizes the target material to produce radiation in the extreme ultraviolet ("EUV") portion of the electromagnetic spectrum.

BACKGROUND

Extreme ultraviolet light, e.g., electromagnetic radiation having a wavelength of around 50 nm or less (also sometimes referred to as soft x-rays), and including light at a wavelength of about 13.5 nm, can be used in photolithography processes to produce extremely small features in substrates such as silicon wafers. Here and elsewhere herein the term "light" is used even though it is understood that the radiation described using that term may not be in the visible part of the spectrum.

Methods for generating EUV light include converting a target material from a liquid state into a plasma state. The target material preferably includes at least one element, e.g., xenon, lithium or tin, with one or more emission lines in the EUV part of the spectrum. In one such method, often termed laser produced plasma ("LPP"), the required plasma is produced by using a laser beam to irradiate and so to vaporize a target material having the required line-emitting element to form a plasma in an irradiation region.

The target material may take many forms. It may be solid or a molten. If molten, it may be dispensed in several different ways such as in a continuous stream or as a stream of discrete droplets. As an example, the target material in the discussion which follows is molten tin which is dispensed as a stream of discrete droplets. It will be understood by one of ordinary skill in the art, however, that other target materials, phases of target materials, and delivery modes for target materials may be used.

The energetic radiation generated during de-excitation and recombination of ions in the plasma propagates from the plasma omnidirectionally. In one common arrangement, a near-normal-incidence mirror (often termed a "collector mirror" or simply a "collector") is positioned to collect, direct, and, in some arrangements, focus the light to an intermediate location. The collected light may then be relayed from the intermediate location to where it is to be used, for example, to a set of scanner optics and ultimately to a wafer in the case where the EUV radiation is to be used for semiconductor photolithography.

The target material is introduced into the irradiation region by a target material dispenser. The target material dispenser is supplied with target material in a liquid or solid form. If supplied with target material in a solid form the target material dispenser melts the target material. The target material dispenser then dispenses the molten target material as a series of droplets into the vacuum chamber containing the irradiation region.

As can be appreciated, one technical requirement for implementation of a target material dispenser is introduction of liquid target material into the area where it will be irradiated. This requires some form of nozzle or jetting structure. One solution for the nozzle uses a glass capillary. A drawback of using a glass capillary is that it is not compatible with the pressures (6000 to 8000 psi) that the nozzle is preferably able to withstand. Also, the nozzle is preferably configured to permit stable modulation of the droplet stream. One method of modulating the droplet stream is to use a tube with a piezoelectric element. When a glass capillary is used as the nozzle it is affixed to the piezoelectric tube, for example, using an epoxy. This arrangement may exhibit instabilities over time. Also, a glass capillary is susceptible to malfunction, either in the form of missing droplets or misdirected droplets, due to particle contamination. There thus remains a need to provide a nozzle structure that can operate reliably under the required operating conditions, including high pressure, that are needed to dispense liquid target material, and to be able to do so stably over time and despite particle contamination.

SUMMARY

The following presents a simplified summary of one or more embodiments in order to provide a basic understanding of the embodiments. This summary is not an extensive overview of all contemplated embodiments, and is not intended to identify key or critical elements of all embodiments nor delineate the scope of any or all embodiments. Its sole purpose is to present some concepts of one or more embodiments in a simplified form as a prelude to the more detailed description that is presented later.

According to one aspect, there is provided a nozzle comprising an orifice through a substrate and a structure defining a plurality of trenches positioned around the orifice, formed on the substrate, and extending generally radially with respect to a central portion of the orifice.

In another aspect, there is provided a nozzle comprising an inlet and an outlet in fluid communication with the inlet, the outlet being formed of an orifice and a plurality of trenches circumferentially spaced around the orifice and formed on a common substrate and extending radially with respect to a central portion of the orifice. The trenches preferably have a width such that a surface tension capillary effect tends to force fluid leaving the orifice towards a central portion of the orifice. The nozzle may be a multilayer structure having a first layer and a second layer on the first layer, where at least part of the inlet is formed in the first layer and at least part of the outlet is formed in the second layer. The first layer may comprise silicon and the second layer may comprise silicon. The first layer and second layer silicon may be covered by silicon dioxide or silicon nitride. There may be a third layer between the first layer and the second layer with at least part of the orifice is formed in the third layer. The third layer may comprise silicon dioxide.

In another aspect, there is provided a multilayer nozzle structure comprising a first layer comprising structure formed from the first layer defining an inlet and a second layer on the first layer, the second layer comprising structure formed from the second layer defining a nozzle orifice aligned with the inlet, the nozzle orifice being in the form of a plurality trenches extending radially with respect to a central portion of the nozzle orifice. The first layer may comprise silicon and the second layer may comprise silicon. The first layer and second layer silicon may be covered by silicon dioxide or silicon nitride. There may be a third layer between the first layer and the second layer with at least part of the orifice is formed in the third layer. The third layer may comprise silicon dioxide.

In another aspect, there is provided a multilayer nozzle structure formed from a SOI (silicon-on-insulator) substrate, the SOI substrate comprising a device layer, an insulating layer, and a handle layer, the nozzle comprising an inlet formed in the handle layer, and a nozzle orifice formed in the device layer and aligned with the inlet, the nozzle orifice being in the form of a plurality trenches extending radially with respect to a central portion of the nozzle orifice.

In another aspect, there is provided a method of making a nozzle in a SOI substrate that has a device layer, an insulating layer, and a handle layer, the method comprising etching an orifice hole through the device layer and buried oxide layer, etching in the device layer a trench pattern around the orifice hole, and etching in the handle layer an inlet aligned with and in fluid communication with the orifice hole.

DETAILED DESCRIPTION

Various embodiments are now described with reference to the drawings, wherein like reference numerals are used to refer to like elements throughout. In the following description, for purposes of explanation, numerous specific details are set forth in order to promote a thorough understanding of one or more embodiments. It may be evident in some or all instances, however, that any embodiment described below can be practiced without adopting the specific design details described below. In other instances, well-known structures and devices are shown in block diagram form in order to facilitate description of one or more embodiments. The following presents a simplified summary of one or more embodiments in order to provide a basic understanding of the embodiments. This summary is not an extensive overview of all contemplated embodiments, and is not intended to identify key or critical elements of all embodiments nor delineate the scope of any or all embodiments.

Figure 1:
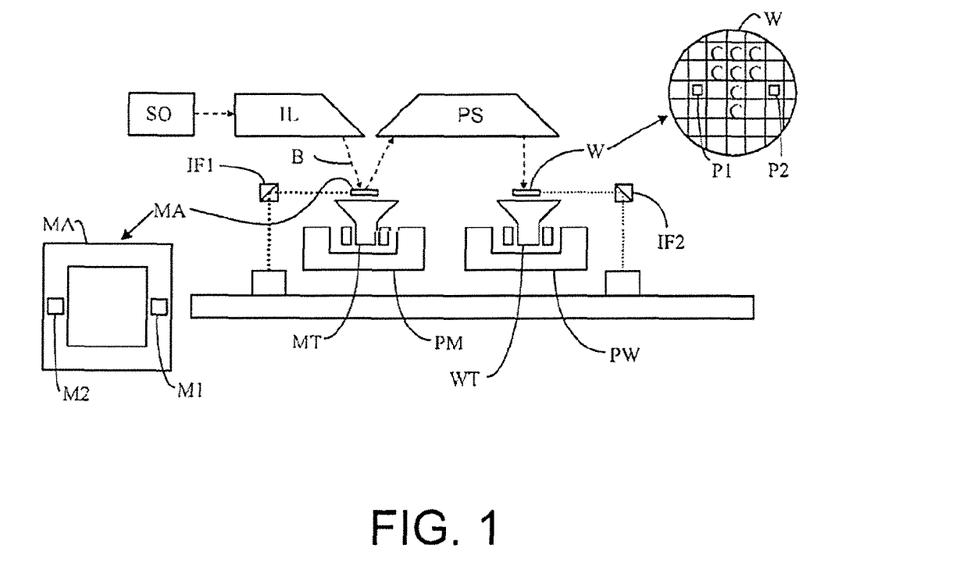
FIG. 1 shows a schematic, not to scale, view of an overall broad conception for a laser-produced plasma EUV light source system according to an aspect of the present invention.

FIG. 1 schematically depicts a lithographic apparatus according to an embodiment of the invention. The apparatus comprises an illumination system IL configured to condition a radiation beam B of radiation. The apparatus also includes a support structure (e.g. a mask table) MT constructed to support a patterning device (e.g. a mask) MA and connected to a first positioner PM configured to accurately position the patterning device in accordance with certain parameters; a substrate table (e.g. a wafer table) WT constructed to hold a substrate (e.g. a resist-coated wafer) W and connected to a second positioner PW configured to accurately position the substrate in accordance with certain parameters; and a projection system (e.g. a refractive or reflective projection lens system) PS configured to project a pattern imparted to the radiation beam B by patterning device MA onto a target portion C (e.g. comprising one or more dies) of the substrate W.

The illumination system IL may include various types of optical components, such as refractive, reflective, magnetic, electromagnetic, electrostatic or other types of optical components, or any combination thereof, for directing, shaping, or controlling radiation.

The support structure MT holds the patterning device in a manner that depends on the orientation of the patterning device, the design of the lithographic apparatus, and other conditions, such as for example whether or not the patterning device is held in a vacuum environment. The support structure MT can use mechanical, vacuum, electrostatic or other clamping techniques to hold the patterning device. The support structure MT may be a frame or a table, for example, which may be fixed or movable as required. The support structure MT may ensure that the patterning device is at a desired position, for example with respect to the projection system.

Referring to FIG. 1, the illumination system IL receives a radiation beam from a radiation source SO. The source SO and the illumination system IL, together with the beam delivery system if required, may be referred to as a radiation system.

The illumination system IL may comprise an adjuster for adjusting the angular intensity distribution of the radiation beam. Generally, at least the outer and/or inner radial extent (commonly referred to as .sigma.-outer and .sigma.-inner, respectively) of the intensity distribution in a pupil plane of the illumination system can be adjusted. In addition, the illumination system IL may comprise various other components, such as an integrator and a condenser. The illumination system may be used to condition the radiation beam, to have a desired uniformity and intensity distribution in its cross-section.

The radiation beam B is incident on the patterning device (e.g., mask) MA, which is held on the support structure (e.g., mask table) MT, and is patterned by the patterning device. Having traversed the patterning device MA, the radiation beam B passes through the projection system PS, which focuses the beam onto a target portion C of the substrate W. With the aid of the second positioner PW and position sensor IF2 (e.g. an interferometric device, linear encoder or capacitive sensor), the substrate table WT can be moved accurately, e.g. so as to position different target portions C in the path of the radiation beam B. Similarly, the first positioner PM and another position sensor IF1 can be used to accurately position the patterning device MA with respect to the path of the radiation beam B, e.g. after mechanical retrieval from a mask library, or during a scan.

Figure 2:
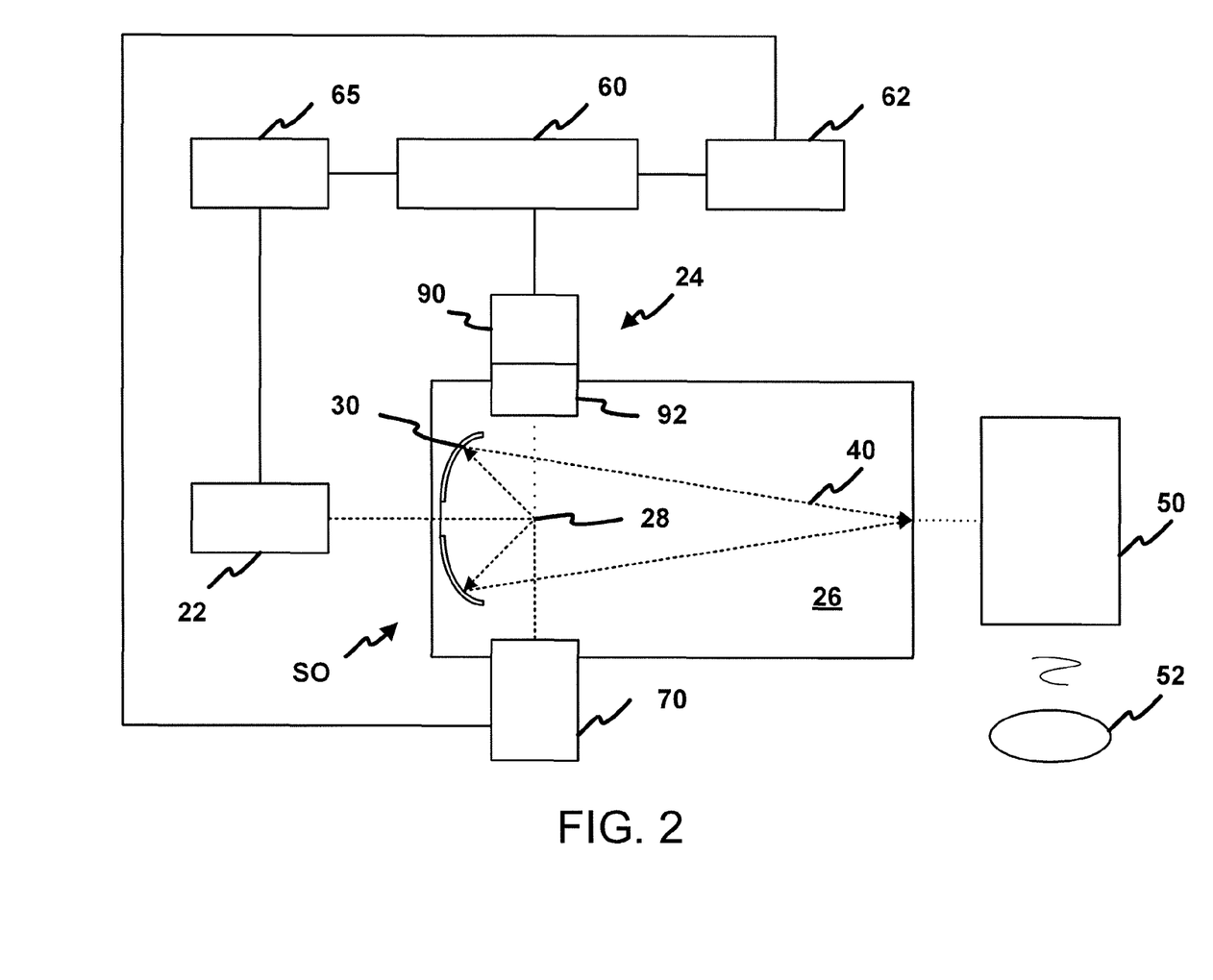
FIG. 2 is a functional block diagram of a light source for the system of FIG. 1.

FIG. 2 shows an embodiment of a source SO such as could be used in the apparatus of FIG. 1 in more detail. The source SO generates EUV radiation from a plasma which is formed at a plasma formation site or irradiation region 28. The plasma is created by directing a laser beam onto a suitable target material such as Sn or Gd which is introduced into the chamber 26 by target material dispenser 24. The laser beam causes the target material to be vaporized, thereby generating the plasma. As mentioned, a source of this type may be referred to as a laser produced plasma or LPP source. The LPP light source SO may include a system 22 for generating a train of light pulses and delivering the light pulses into a chamber 26. As detailed below, each light pulse may travel along a beam path from the system 22 and into the chamber 26 to illuminate a respective target droplet at an irradiation region 28. It should be noted that as used herein an irradiation region is a region for source material irradiation to occur, and is an irradiation region even at times when no irradiation is actually occurring. In the example which follows, the example of a target material dispenser 24 that dispenses target material in the form of droplets of target material will be used. It will be appreciated, however, that the target material dispenser 24 can also dispense target material in other forms, including a continuous stream of target material.

Suitable lasers for use in the system SO shown in FIG. 2 may include a pulsed laser device, e.g., a pulsed gas discharge $CO_2$ laser device producing radiation at 9.3 µm or 10.6 µm, e.g., with DC or RF excitation, operating at relatively high power, e.g., 10 kW or higher and high pulse repetition rate, e.g., 50 kHz or more. In one particular implementation, the laser may be an axial-flow RF-pumped $CO_2$ laser having an oscillator-amplifier configuration (e.g. master oscillator/power amplifier (MOPA) or power oscillator/power amplifier (POPA)) with multiple stages of amplification and having a seed pulse that is initiated by a Q-switched oscillator with relatively low energy and high repetition rate, e.g., capable of 100 kHz operation. From the oscillator, the laser pulse may then be amplified, shaped and/or focused before reaching the irradiation region 28. Continuously pumped $CO_2$ amplifiers may be used for the system SO. For example, a suitable $CO_2$ laser device having an oscillator and three amplifiers (O-PA1-PA2-PA3 configuration) is disclosed in U.S. Pat. No. 7,439,530, issued on Oct. 21, 2008, the entire contents of which are hereby incorporated by reference herein. Alternatively, the laser may be configured as a so-called "self-targeting" laser system in which the droplet serves as one mirror of the optical cavity. In some "self-targeting" arrangements, an oscillator may not be required. Self-targeting laser systems are disclosed and claimed in U.S. Pat. No. 7,491,954, issued on Feb. 17, 2009, the entire contents of which are hereby incorporated by reference herein.

Depending on the application, other types of lasers may also be suitable, e.g., an excimer or molecular fluorine laser operating at high power and high pulse repetition rate. Other examples include, a solid state laser, e.g., having a fiber, rod, slab or disk-shaped active media, other laser architectures having one or more chambers, e.g., an oscillator chamber and one or more amplifying chambers (with the amplifying chambers in parallel or in series), a master oscillator/power oscillator (MOPO) arrangement, a master oscillator/power ring amplifier (MOPRA) arrangement, or a solid state laser that seeds one or more excimer, molecular fluorine or $CO_2$ amplifier or oscillator chambers, may be suitable. Other designs may be suitable.

As further shown in FIG. 2, the target material dispenser 24 delivers target material into the interior of the chamber 26 to the irradiation region or plasma site 28, where the target material will interact with one or more light pulses, e.g., zero, one or more pre-pulses and thereafter one or more main pulses, to ultimately produce a plasma and generate an EUV emission. The EUV emitting element, e.g., tin, lithium, xenon, etc., may be in the form of liquid droplets and/or solid particles contained within liquid droplets. For example, the element tin may be used as pure tin, as a tin compound, e.g., $SnBr_4$, $SnBr_2$, $SnH_4$, as a tin alloy, e.g., tin-gallium alloys, tin-indium alloys, tin-indium-gallium alloys, or a combination thereof. Depending on the material used, the target material may be presented to the irradiation region 28 at various temperatures including room temperature or near room temperature (e.g., tin alloys, $SnBr_4$), at an elevated temperature, (e.g., pure tin) or at temperatures below room temperature, (e.g., $SnH_4$), and in some cases, can be relatively volatile, e.g., $SnBr_4$. More details concerning the use of these materials in an LPP EUV light source is provided in U.S. Pat. No. 7,465,946, issued on Dec. 16, 2008, the entire contents of which are hereby incorporated by reference herein. In some cases, an electrical charge is placed on the target material to permit the target material to be steered toward or away from the irradiation region 28.

Continuing with FIG. 2, the light source SO may also include one or more EUV optical elements such as EUV optic 30. The EUV optic 30 may be a collector mirror in the form of a normal incidence reflector, for example, implemented as a multilayer mirror (MLM), that is, a SiC substrate coated with a Mo/Si multilayer with additional thin barrier layers deposited at each interface to effectively block thermally-induced interlayer diffusion. Other substrate materials, such as Al or Si, can also be used. The EUV optic 30 may be in the form of a prolate ellipsoid, with an aperture 35 to allow the laser light to pass through and reach the irradiation region 28. The EUV optic 30 may be, e.g., in the shape of a ellipsoid that has a first focus at the irradiation region 28 and a second focus at a so-called intermediate point 40 (also called the intermediate focus 40) where the EUV light may be output from the EUV light source 20 and input to, e.g., an integrated circuit lithography tool as described above.

The EUV light source 20 may also include an EUV light source controller system 60, which may also include a laser firing control system 65, along with, e.g., a laser beam positioning system (not shown). The EUV light source 20 may also include a target position detection system which may include one or more droplet imagers 70 that generate an output indicative of the absolute or relative position of a target droplet, e.g., relative to the irradiation region 28, and provide this output to a target position detection feedback system 62. The target position detection feedback system 62 may use this output to compute a target position and trajectory, from which a target error can be computed. The target error can be computed on a droplet-by-droplet basis, or on average, or on some other basis. The target error may then be provided as an input to the light source controller 60. In response, the light source controller 60 can generate a control signal such as a laser position, direction, or timing correction signal and provide this control signal to a laser beam positioning controller (not shown). The laser beam positioning system can use the control signal to control the laser timing circuit and/or to control a laser beam position and shaping system (not shown), e.g., to change the location and/or focal power of the laser beam focal spot within the chamber 26.

As shown in FIG. 2, the light source SO may include a target delivery control system 90. The target delivery control system 90 is operable in response to a signal, for example, the target error described above, or some quantity derived from the target error provided by the system controller 60, to correct for errors in positions of the target droplets within the irradiation region 28. This may be accomplished, for example, by repositioning the point at which a target delivery mechanism 92 releases the target droplets. The target delivery mechanism 92 extends into the chamber 26 and is also externally supplied with target material and a gas source to place the target material in the target delivery mechanism 92 under pressure.

Figure 3:
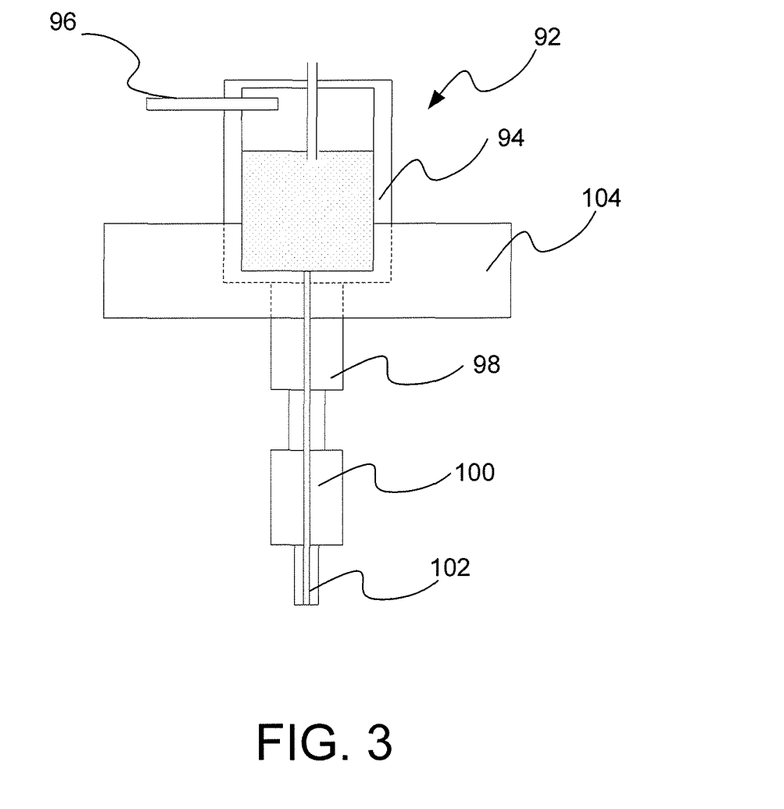
FIG. 3 is a functional block diagram of a target material supply and dispensing system for the light source of FIG. 2.

FIG. 3 shows in greater detail a target delivery mechanism 92 for delivering target material into the chamber 26. For the generalized embodiment shown in FIG. 3, the target delivery mechanism 92 may include a reservoir 94 holding a molten target material such as tin. Heating elements (not shown) controllably maintain the target delivery mechanism 92 or selected sections thereof at a temperature above the melting temperature of the target material. The molten target material may be placed under pressure by using an inert gas such as argon introduced through a feed line 96. The pressure preferably forces the target material to pass through a set of filters 98. From the filters 98, the material may pass through a valve 100 to a nozzle 102. For example valve 100 may be a thermal valve. A Peltier device may be employed to establish the valve 100, freezing target material between the filters 98 and nozzle 102 to close the valve 100 and heating the solidified target material to open the valve 100. FIG. 3 also shows that the target delivery system 92 is coupled to a movable member 104 such that motion of the movable member 104 changes the position of the point at which droplets are released from the nozzle 102. Motion of the movable member 104 is controlled by a droplet release point positioning system, as described in co-pending U.S. patent application Ser. No. 13/328,628, titled "DROPLET GENERATOR STEERING SYSTEM" filed on Dec. 16, 2011 and published Jun. 20, 2013 as Pub. No. 2013/0153792, assigned to Cymer Inc., the entirety of which is hereby incorporated by reference herein.

For the target delivery mechanism 92, one or more modulating or non-modulating target material dispensers may be used. For example, a modulating dispenser may be used having a capillary tube formed with an orifice. The nozzle 102 may include one or more electro-actuatable elements, e.g. actuators made of a piezoelectric material, which can be selectively expanded or contracted to deform the capillary tube and modulate a release of source material from the nozzle 102. Examples of modulating droplet dispensers can be found in U.S. Pat. No. 7,838,854.

As stated, the droplets are released by a nozzle 102. To be useful as a nozzle for a target material dispenser, the nozzle preferably is able to operate at relatively high pressures, for example, from about 6000 pounds per square inch to about 8000 pounds per square inch. It should also be able to operate despite the possible presence of particles in the fluid supplied to the nozzle or at the nozzle head, a characteristic referred to as low sensitivity to particles. It is also preferable that the nozzle permit good control over the exit angle and velocity of the droplets. It is also preferable that the nozzle enable flexibility in permitting multiple design options for coupling the nozzle to other components in the system, in particular, to elements that are provided to modulate the droplet stream.

Figure 4:
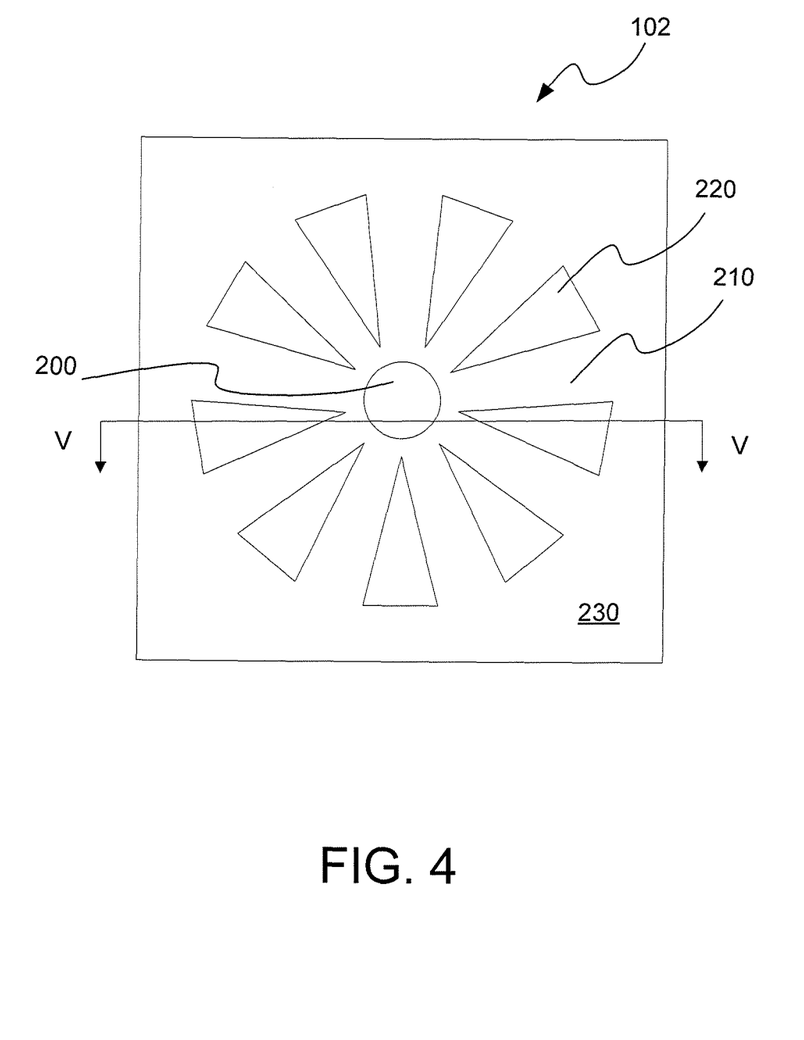
FIG. 4 is a plan view of a nozzle structure for the target material supply and dispensing system of FIG. 3.

To improve the nozzle's resistance to malfunction due to particle contamination (i.e., missing or misdirected droplets) as well as the nozzles's stability, it is preferred to make a nozzle having a "star-shaped" structure at the nozzle orifice. Here, star-shaped means an arrangement of trenches positioned around the orifice extending radially from a central portion of the orifice. This can also be conceptualized as a ring of circumferentially spaced wedge-shaped elements having vertices arranged around and oriented towards the center of the orifice 200. Such an arrangement is shown in FIG. 4, where the orifice 200 has a series of trenches 210 extending radially around it. In other words, the trenches 200 extend radially outward from (or, equally, inward towards) a central portion of the orifice 200. The trenches 210 are defined by a circumferential array of elements 220. In the arrangement shown the elements 220 are generally wedge-shaped with the vertex of each wedge pointing generally towards the center of the orifice 200.

FIG. 4 shows an arrangement having nine trenches 210 defined by nine wedge-shaped elements 220 with the vertices of the elements 220 pointing generally towards a central portion of the orifice 200. The elements 220 of FIG. 4 are generally wedge shaped, but other shapes could be used. Also, any suitable number of elements 220 of any given size may be used although it is preferred that the number and sizing be chosen so that the width of the trenches 210 is such that a surface tension capillary effect will tend to confine the liquid target material to the center area of the star-shaped structure. Also, as shown, it is preferred that the arrangement of the trenches 210 be rotationally symmetric around the center of the orifice 200 and that the trenches 210 essentially surround the orifice 200. This creates the star-shaped pattern labeled 230 in FIG. 4.

A preferred method of fabricating the star-shaped arrangement of FIG. 4 uses a microfabricated silicon channel design. For these purposes, the nozzle 120 may be conceived of as having three features; (1) an inlet; (2) a channel orifice; and (3) a star-shaped structure such as that shown in FIG. 4 arranged around the orifice. Such an arrangement is shown in FIG. 5, which is a schematic cross-section taken along line V-V in FIG. 4.

Figure 5:
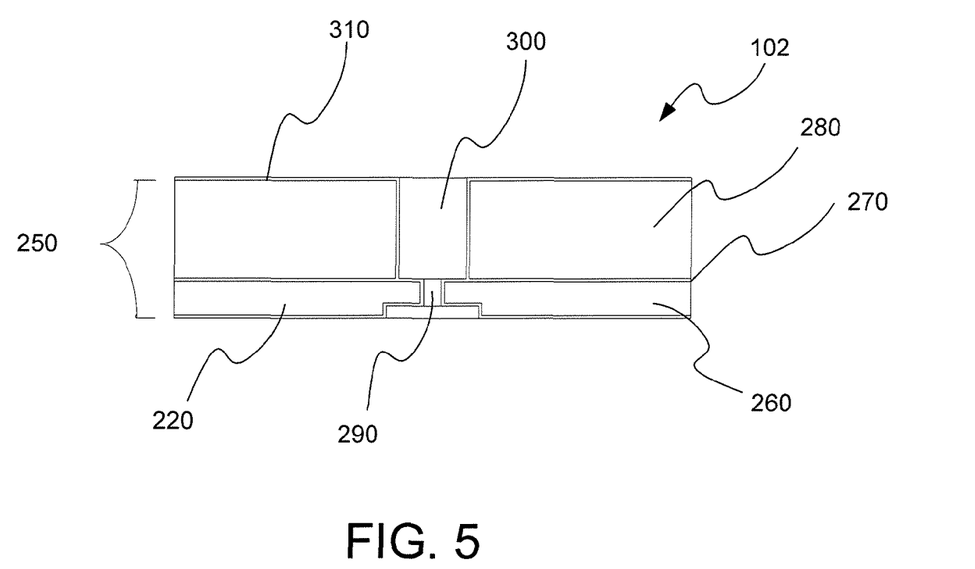
FIG. 5 is a schematic cutaway view of the nozzle structure of FIG. 4 taken along line V-V of FIG. 4.

In the arrangement of FIG. 5, the nozzle 120 is fabricated on a SOI (silicon-on-insulator) wafer 250. The wafer 250 has three layers: a thin surface layer 260 of silicon (from a few hundred Angstroms to tens of microns thick), sometimes referred to as the device layer, an underlying layer 270 of insulating material, and a support or "handle" silicon wafer 280. The insulating layer 270, preferably made of silicon dioxide and referred to as the "buried oxide" or "BOX", is usually a few thousand Angstroms to several microns thick.

In fabricating the nozzle 120 using such a wafer 250, the fabrication steps may be as follows. First, an orifice hole 290 is etched at the device layer 260, stopping at the buried oxide layer 270. Next, the pattern of trenches 210 and elements 220 etched at the device layer 260. Then, after a front/back side alignment, an inlet 300 is etched on the handle layer 280. Then, the buried oxide at the nozzle orifice is removed by wet or dry etch method. This is followed with thermal oxidation creating the silicon dioxide layers 310 on the exposed surfaces. The wafer 250 is then diced in a known manner to obtain the nozzle 120. The resulting structure is shown in FIG. 5.

In the case where the nozzle is made using semiconductor fabrication techniques and referring again to FIG. 4, the diameter of the orifice 200 would typically be in the range of about 1 micron to about 20 microns. The wedge elements 220 would typically have a lateral extension (base to tip) in the range of about 30 microns to about 500 microns. The height of the wedge elements 220 (and the depth of the trenches 210) would typically be in the range of about 5 microns to about 100 microns. The width of the trenches 210 between the wedge elements 220 would typically be in the range of about 0.5 microns to about 5 microns.

The resultant structure is a multilayer nozzle structure comprising a first layer in which an inlet has been formed and a second layer on the first layer, in which the wedge-shaped elements and the orifice are formed. There is also a third layer interposed between the first layer and the second layer in which the orifice is also formed. Even in this arrangement, the second layer is on the first layer in the sense that second layer is supported by the first layer.

One aspect of the star-shaped nozzle structure is that it may provide self-correction of the droplet stream during operation. The resultant liquid metal surface tension capillary effect tends to confine the liquid target material in the center area of the star-shaped structure. This can result in several benefits. For example, it tends to reduce the pressure drop across the nozzle orifice. It also provides for self-correction of the exit angle of the liquid target material droplet stream. It also makes operation more immune to the presence of particles at the orifice.

Making the nozzle primarily out of silicon also creates flexibility in integrating the nozzle with metal or ceramic parts in the droplet generator. There can be a broad range of options for the nozzle integration. For example, it is possible to anodic bond the silicon nozzle to a glass plate, and anodic bond the glass plate to a metal plate. As another example, one could use a metal inter-layer to bond the nozzle device onto a ceramic or metal plate. It would also be possible to use a polyimide (PI) ferrule sealing the nozzle onto a supporting metal plate. It would also be possible to use a PI adhesive to attach the nozzle onto a supporting metal or ceramic plate. It would also be possible to use spin glass or cement to attach the nozzle onto a metal or ceramic part.

The above description includes examples of multiple embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is construed when employed as a transitional word in a claim. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A nozzle comprising an inlet and an outlet in fluid communication with the inlet, the outlet being formed of an orifice through a substrate and a structure defining a plurality of trenches positioned around the orifice, each of the trenches being formed on the substrate, and having a length extending generally radially with respect to a central portion of the orifice, wherein the nozzle is a multilayer structure having a first layer and a second layer on the first layer, where at least part of the inlet is formed in the first layer and at least part of the outlet is formed in the second layer.

2. A nozzle comprising:
   an inlet; and
   an outlet in fluid communication with the inlet, the outlet being formed of an orifice and a plurality of trenches circumferentially spaced around the orifice and formed on a common substrate and having a length extending radially with respect to a central portion of the orifice, wherein the nozzle is a multilayer structure having a first layer and a second layer on the first layer, where at least part of the inlet is formed in the first layer and at least part of the outlet is formed in the second layer.

3. A nozzle as claimed in claim 2 wherein the trenches have a width such that a surface tension capillary effect tends to force fluid leaving the orifice towards a central portion of the orifice.

4. A nozzle as claimed in claim 2 wherein the first layer comprises silicon.

5. A nozzle as claimed in claim 4 wherein the first layer is at least partially covered by silicon dioxide or silicon nitride.

6. A nozzle as claimed in claim 2 wherein the second layer comprises silicon.

7. A nozzle as claimed in claim 6 wherein the second layer is at least partially covered by silicon dioxide or silicon nitride.

8. A nozzle as claimed in claim 2 further comprising a third layer interposed between the first layer and the second layer and wherein at least part of the orifice is formed in the third layer.

9. A nozzle as claimed in claim 8 wherein the third layer comprises silicon dioxide.

10. A multilayer nozzle structure comprising:
    a first layer comprising structure formed from the first layer defining an inlet; and
    a second layer on the first layer, the second layer comprising structure formed from the second layer defining a nozzle orifice aligned with the inlet, the nozzle orifice being in the form of a plurality trenches having a length extending radially with respect to a central portion of the nozzle orifice.

11. A nozzle as claimed in claim 10 wherein the first layer comprises silicon.

12. A nozzle as claimed in claim 10 wherein the first layer is at least partially covered by silicon dioxide or silicon nitride.

13. A nozzle as claimed in claim 10 wherein the second layer comprises silicon.

14. A nozzle as claimed in claim 13 wherein the second layer is at least partially covered by silicon dioxide or silicon nitride.

15. A nozzle as claimed in claim 10 further comprising a third layer interposed between the first layer and the second layer and wherein at least part of the orifice is formed in the third layer.

16. A nozzle as claimed in claim 15 wherein the third layer comprises silicon dioxide.

17. A multilayer nozzle structure formed of an SOI substrate, the SOI substrate comprising a device layer, an insulating layer, and a handle layer, the nozzle comprising:
    an inlet formed in the handle layer; and
    a nozzle orifice formed in the device layer and aligned with the inlet, the nozzle orifice being in the form of a plurality trenches having a length extending radially with respect to a central portion of the nozzle orifice.

18. A nozzle comprising an inlet and an outlet in fluid communication with the inlet, the outlet being formed of an orifice through a substrate and a ring of circumferentially spaced wedge-shaped elements defining between pairs of the wedge shaped elements a respective one of a plurality of trenches positioned around the orifice, each of the trenches being formed on the substrate, and having a length extending generally radially with respect to a central portion of the orifice, wherein the nozzle is a multilayer structure having a first layer and a second layer on the first layer, where at least part of the inlet is formed in the first layer and at least part of the outlet is formed in the second layer.

19. A nozzle as claimed in claim 18 wherein the wedge-shaped elements are arranged in a circumferential array with the vertex of each wedge pointing generally towards the center of the orifice.

* * * * *